United States Patent [19]

Matsuoka et al.

[11] Patent Number: 4,499,739
[45] Date of Patent: Feb. 19, 1985

[54] CONTROL DEVICE FOR REFRIGERATION CYCLE

[75] Inventors: Fumio Matsuoka, Kamakura; Hitoshi Iijima, Chigasaki; Kisuke Yamazaki, Kamakura; Hiroshi Kasagi, Chigasaki; Yasuo Nakashima, Shizuoka; Kiyoshi Sakuma, Fujieda; Mitsuo Umehara, Toride, all of Japan

[73] Assignee: Mitsubishi Denki Kabushiki Kaisha, Tokyo, Japan

[21] Appl. No.: 526,383

[22] Filed: Aug. 24, 1983

[30] Foreign Application Priority Data

Nov. 22, 1982 [JP] Japan ................. 57-204976

[51] Int. Cl.³ .................. F25B 41/04; F25B 13/00
[52] U.S. Cl. .......................... 62/212; 62/197;
  62/225; 62/196.3; 62/160; 62/158
[58] Field of Search .............. 62/197, 225, 212, 204,
  62/205, 196.3, 278, 160, 157, 158, 231, 222, 223,
  224, 210, 211

[56] References Cited

U.S. PATENT DOCUMENTS 3,264,837  8/1966  Harnish ........................... 62/117
4,055,963 11/1977  Shoji et al. ...................... 62/197
4,122,688 10/1978  Mochizuki et al. ............... 62/278
4,326,868  4/1982  Ozu et al. ...................... 62/196.3
4,362,027 12/1982  Barbier .......................... 62/197

Primary Examiner—Harry B. Tanner
Attorney, Agent, or Firm—Oblon, Fisher, Spivak, McClelland & Maier

[57] ABSTRACT

A control device for refrigeration cycle constructed with a compressor, a condenser, an electrically operated expansion valve, an evaporator, and so forth, all being connected in series, wherein there are further provided a by-pass extending from an inlet or an outlet or both of the expansion valve upto an inlet of the compressor through a capillary tube; a first temperature sensor to sense a temperature of a cooling medium at the inlet of the compressor; a second temperature sensor to sense a temperature of the cooling medium within an intake tubing, through which the cooling medium is taken into the inlet of the compressor; and a control device which calculates a super-heat quantity of the cooling medium taken into the compressor on the basis of a difference between the detection outputs of the first and second temperature sensors, and controls a degree of opening of the electrically operated expansion valve, thereby enabling the refrigeration cycle to be operated at high efficiency and in an energy-saving mode.

5 Claims, 11 Drawing Figures $$\frac{1}{5} E_{MAX} \leq \Delta E \leq \frac{1}{10} E_{MAX} \quad K > 1$$

CONTROL DEVICE FOR REFRIGERATION CYCLE

This invention relates to a device for controlling a refrigeration cycle, which is of an energy-saving type and which operates at a high efficiency, wherein a super-heat quantity of a cooling medium taken into a compressor is detected, and the degree of opening of an electrically operated expansion valve is controlled by the super-heat quantity as detected.

In the prior art, a temperature operated type self-expansion valve has been used as a pressure-reducing device for such a refrigeration cycle. However, since this type of expansion valve is operated by converting temperature variations into pressure variations through a temperature sensing cylinder which is in contact with a portion of a tubing where the super-heat quantity is to be controlled, its response is slow with the consequence that the valve becomes unable to follow an abrupt change in the load. On account of this, the temperature operated type automatic expansion valve has various disadvantages such as a tendency to bring about a liquid-back phenomenon and a hunting phenomenon.

In addition, since the temperature operated type automatic expansion valve does not directly sense the super-heat, it was utterly impossible to control the super-heat as its optimum quantity in conformity with an operating condition of an air conditioning system.

Further, in the conventional electrically-operated expansion valve, wherein the super-heat quantity is detected as a control signal for controlling the expansion valve, the super-heat quantity (SH) is simply calculated from an equation $SH = Ts - Te$ (where: Te denotes a temperature at an entrance or intermediate portion of an evaporator, and Ts represents a temperature at an entrance of a compressor). In this case, however, there inevitably takes place a decrease in pressure at the entrance or intermediate portion of the evaporator, and at the entrance of the compressor. Since this amount of decrease in pressure varies depending on the operating condition of the control device, it was impossible to accurately detect the quantity of super-heat.

Besides the above, there is a type of the control device, in which a pressure sensor and a temperature sensor are provided at the entrance of the compressor to detect the super-heat quantity. This type of control device, however, becomes disadvantageously expensive for the reason that the pressure sensor is costly.

Also, there is a refrigeration cycle control device as shown in FIG. 1 of the accompanying drawing. In this figure reference numerals 21 to 24 designate check valves, and a numeral 25 refers to a temperature sensing cylinder for the expansion valve.

At the time of defrosting, a circulating process is formed in such a manner that the cooling medium at high temperature and high pressure, which has been discharged from the compressor 1, passes through a four-way valve 2, and reaches a heat-exchanger 3 outside the refrigerating chamber where the coolant carries out defrosting and heat-exchanging to be turned into liquid at high temperature and high pressure. Then, the liquid passes through distributors 4a, 4b and a check valve 21 to reach an expansion valve 5 where it is reduced in pressure, after which the liquid is again taken into the compressor 1 through the check valve 24, a heat-exchanger 6 inside the refrigerating chamber, the four-way valve 2, an accumulator 7, and an intake tube 8.

In this instance, a fan (not shown) of the heat-exchanger 6 at the refrigerating chamber interior is stopped, because, cool air is blown out when it runs. As a consequence of this, the low temperature and low pressure cooling medium in two-phase current resulted from the pressure reduction by the expansion valve 5 is not heat-exchanged by the heat-exchanger 6 at the refrigerating chamber interior, but is introduced into the accumulator 7, as it is, where the liquid cooling medium stagnates with a consequent decrease in the circulating flow-rate of the cooling medium as well as a decrease in the input to the compressor which prolongs the defrosting time, all of which are disadvantageous to the proper control of the refrigeration cycle.

During the normal operations of the refrigeration cycle control device, on the other hand, the temperature operated expansion valve 5 is employed and the temperature sensing cylinder is provided on the intake tube 8 of the compressor 1 to carry out the control of the super-heat. In this case, however, since the temperature variations are detected by temperature sensing cylinder 25, which detection results are converted into pressure variations, the response of the valve slows down and is unable to follow abrupt change in the load and variations in the operating capacity of the compressor, whereby liquid back, hunting, and other phenomena tend to occur readily, and, moreover, since the super-heat quantity is not directly sensed, arbitrary control of the refrigeration cycle was impossible to bring the same to the optimum condition in conformity with the operating condition. Furthermore, since the flow rate and flowing direction of the cooling medium becomes opposite due to the changing-over between cooling and warming, the check valves 21 to 24 were required to maintain definite the flowing direction of the cooling medium into the temperature operated expansion valve 5.

It is therefore an object of the present invention to provide a super-heat detection system to control the refrigeration cycle, which is capable of accurately detecting the absolute value of the super-heat quantity of the cooling medium to be taken into the compressor, and of precisely controlling the expansion valve.

It is another object of the present invention to provide a refrigeration cycle control device which is capable of controlling the degree of opening of the expansion valve so that the super-heat quantity can be varied arbitrarily at the time of controlling the capacity of the compressor through detection of such super-heat quantity, and of performing throttling operation of the expansion valve even when the flowing direction of the cooling medium becomes reversed.

It is still another object of the present invention to provide a refrigeration cycle control device which is capable of maintaining the optimum super-heat quantity, for protecting the compressor from getting into unexpected trouble, by applying an electrical signal to the control device in such a manner that the operation for closing the electrically operated expansion valve be done more quickly and greatly than the operation for opening the same, and also which is capable of expectedly improving the operational reliability and coefficient of performance of the compressor in addition to its protection.

It is another object of the present invention to provide a refrigeration cycle control device which is capable of performing precise operational controls in consideration of comfortableness in the air conditioned environment as well as energy-saving of the air conditioning system, by controlling the degree of opening of the electrically operated expansion valve based on the super-heat quantity of the cooling medium to be taken into the compressor, and by increasing this super-heat quantity, at the time of the valve control, when any of the external temperature, the pressure value at the low pressure side, and the temperature value at the low pressure side is below a predetermined value.

According to the present invention, in a general aspect of it, there is provided a control device for a refrigeration cycle constructed with a compressor, a condenser, an electrically operated expansion valve, an evaporator, and so forth, all being connected in series, said control device being characterized by further comprising a by-pass extending from an inlet or an outlet or both of said expansion valve up to an inlet of said compressor through a capillary tube; a first temperature sensor to detect the temperature of a cooling medium at an open end to the inlet side of said compressor in said by-pass; a second temperature sensor to detect the temperature of the cooling medium within an intake tubing, through which the cooling medium is taken into said compressor through the inlet thereof; and a control device which calculates a super-heat quantity of the cooling medium taken into said compressor on the basis of a difference between detected outputs of said first and second temperature sensors, and performs the control of the degree of opening of said electrically operated expansion valve.

The foregoing objects, other objects as well as specific construction and operations of the refrigeration cycle control device according to the present invention will become more apparent and understandable from the following detailed description thereof when read in conjunction with the accompanying drawing.

Figure 9:
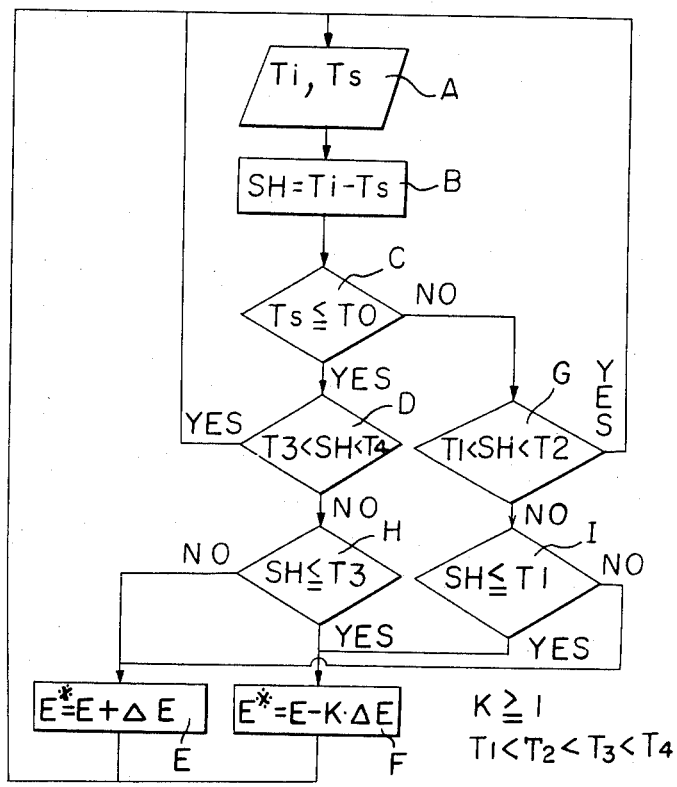
Figure 10:
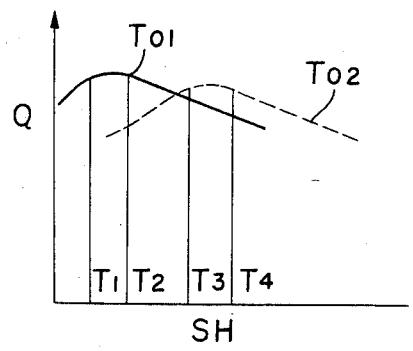
Figure 11:
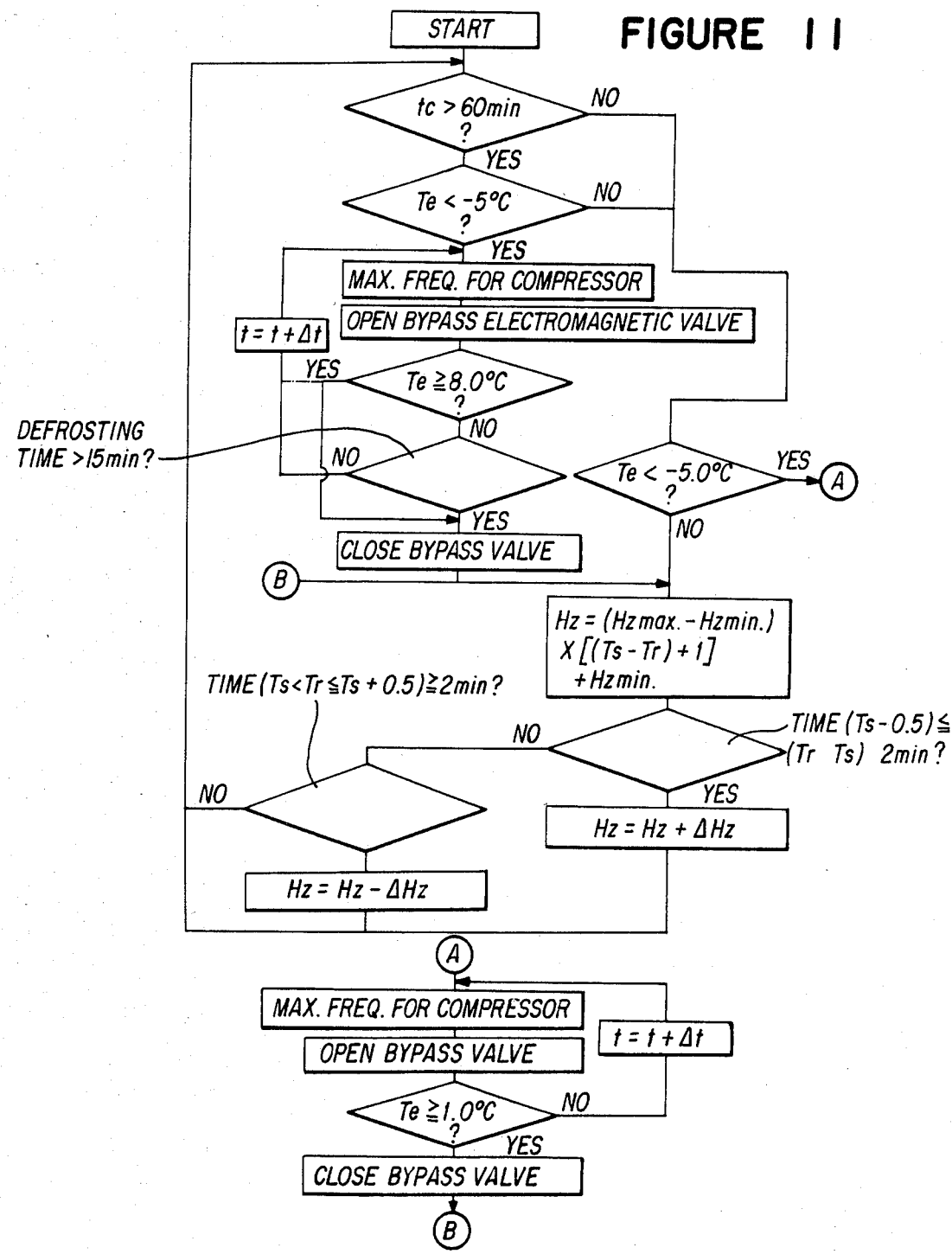

FIG. 9 is a flow chart indicating the operations and the determination of another embodiment of the control device for controlling the electrically operated expansion valve in the refrigerating cycle; and FIG. 10 is a schematic graphical representation showing an inter-relationship among the external temperature, the super-heat quantity, and the warming capability; and FIG. 11 is a flow chart indicating the operations and the determination of another embodiment of the control device for controlling an electromagnetic valve.

In the following, the refrigeration cycle control device according to the present invention will be described in detail with reference to a preferred embodiment thereof, wherein it is adopted in an air conditioning apparatus.

Figure 1:
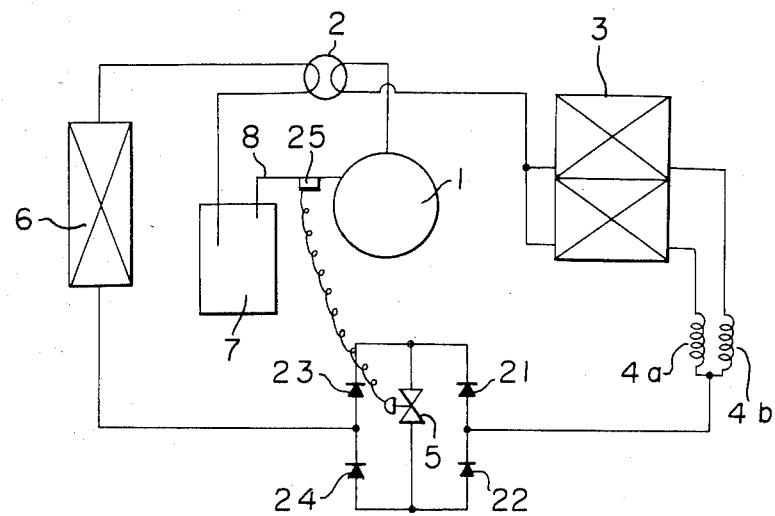
FIG. 1 is a refrigeration circuit diagram of a generally known capacity control type refrigeration cycle control device.
Figure 2:
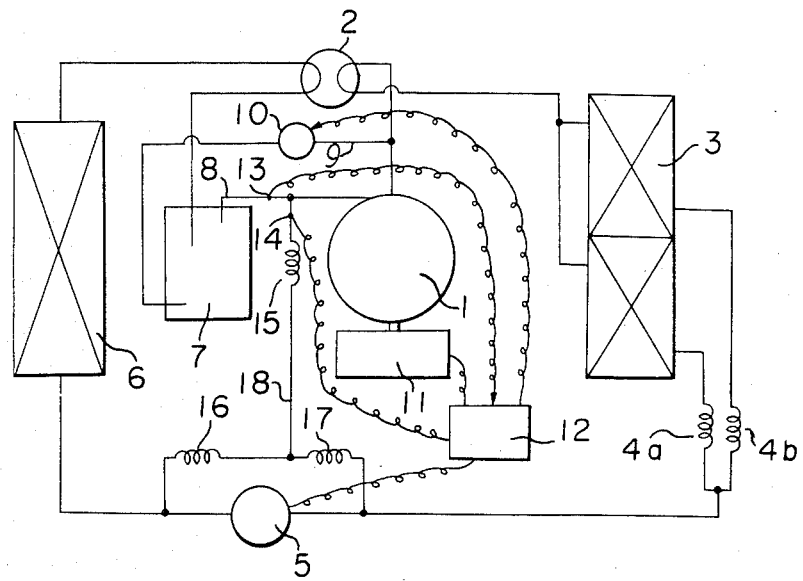
FIG. 2 is a refrigeration circuit diagram of the capacity control type refrigeration cycle control device according to one embodiment of the present invention.

FIG. 2 is a circuit diagram showing one embodiment of the cooling medium flow according to the present invention. In the drawing, a reference numeral 1 designates a compressor of a capacity control type. A high temperature, high pressure coolant gas which has been compressed by the compressor 1 passes through a four-way valve 2, is liquefied and condensed in a heat-exchanger 3 outside the refrigerating chamber to be used as a condenser, is reduced its pressure by an electrically operated expansion valve 5 through distributors 4a, 4b, is evaporated and gassified by another heat-exchanger 6 inside the refrigerating chamber to be used as an evaporator, and reaches an accumulator 7 through the four-way valve 2.

The circuit is also constructed in such a manner that, of the two ends of the electrically operated expansion valve 5, the cooling medium flowing from the high pressure side passes through a capillary tube 17, a part of which merges at the down-stream side of the electrically operated expansion valve 5 through a capillary tube 16, another part of which passes through a by-pass 18 and a capillary tube 15 to be reduced in pressure, and then merges with an intake tube 8.

Figure 5:
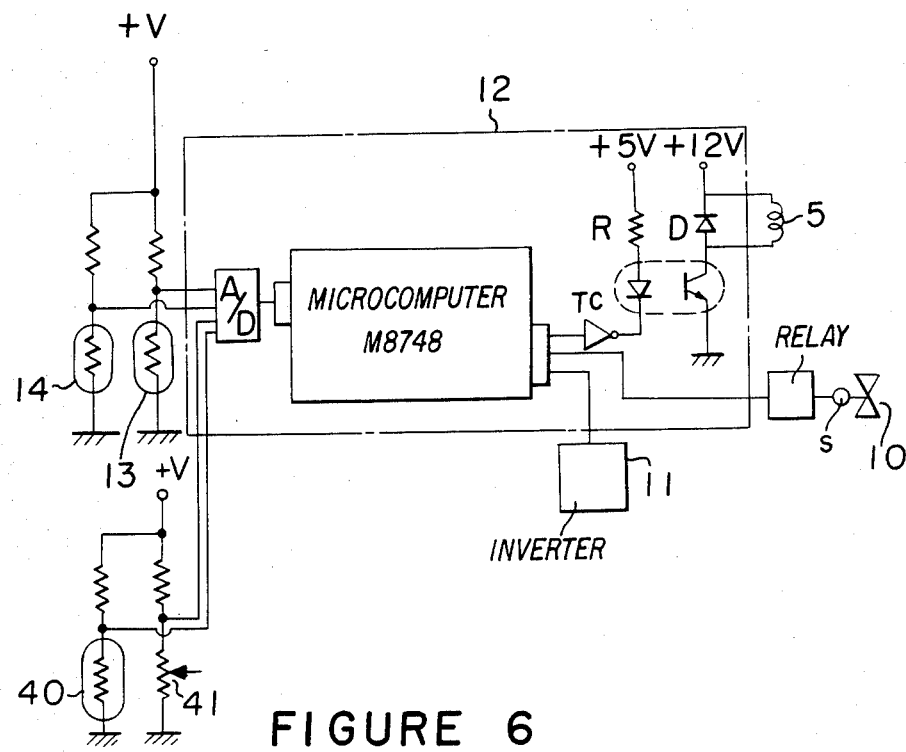
FIG. 5 is an electrical circuit diagram showing one embodiment of a control device according to the present invention.

Temperature sensors 14 and 13, each being composed of a thermister, are respectively provided in the vicinity of the intake tube 8 in the by-pass 18 and in the intake tube itself. Outputs from both of these temperature sensors 13 and 14 are sent to the control device 12. The control device 12 is so constructed as shown in FIG. 5 with a single chip micro-computer M8748 manufactured by Mitsubishi Denki Kabushiki Kaisha, Japan, as the principal component element, which controls a degree of opening of the electrically operated expansion valve 5.

The single-chip micro-computer M8748 consists of a single LSI including a CPU for performing logical operation, a RAM for storing data temporarily, a ROM for storing programs, an I/O port for exchanging digital signals between the interior and the exterior of the micro-computer and an A/D converter for converting analogue signals into digital signals.

As data input into the micro-computer, there are temperature in a room, given by a thermistor 40 and a preset temperature given by a variable resistor 41, which serve to control the capacity of the compressor i.e. to control the frequency of an inverter 11, super-heat given by the thermistors 13, 14 and the frequency of the inverter which serve to control the electrically operated expansion valve 5, and saturation temperature given by the thermistor 14 for controlling an electromagnetic valve provided in a by-pass 9. All data detected by these elements are input in the A/D converter to be converted into digital signals and temporarily stored in the RAM through the I/O port. The CPU processes the data in the RAM in accordance with a program memorized in the ROM to control the increase and decrease in frequency of the inverter 11 depending on difference between the room temperature given by the thermistor 40 and the present temperature given by the variable resistor 41, to open and close the electrically operated expansion valve 5 so as to maintain super-heat in a predetermined range and to control the by-pass electromagnetic valve 10 in comparison of the saturation temperature given by the thermistor 14 with a preset level given by the variable resistor 41. The by-pass 9 connects an outlet side of the compressor 1 and the accumulator 7.

Figure 3:
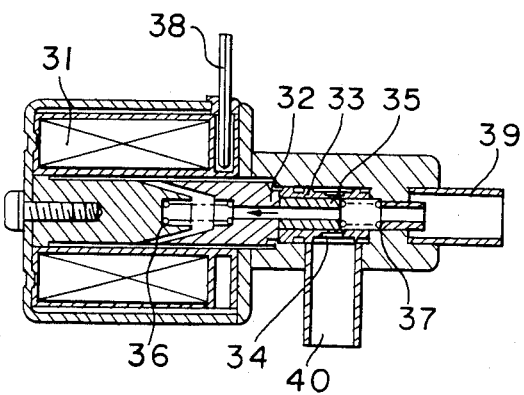
FIG. 3 is a cross-sectional view of a construction showing one embodiment of an electrically operated expansion valve according to the present invention.

FIG. 3 illustrates a construction of the electrically operated expansion valve 5, in which a reference numeral 31 designates an electromagnetic winding, a numeral 32 refers to a plunger, 33 a cylinder having therein a slit 34. A numeral 35 refers to a piston, 36 and 37 denote springs, 38 a lead wire, and 39 and 40 tubes for cooling medium.

When electric current input is passed into the lead wire 38 from the control device 12, there is generated a force to pull the plunger 32 in the arrow direction in proportion to the electric current conducted through the electromagnetic winding 31, and the plunger 32 stops at a position where a balance of spring force is attained between the springs 36 and 37. Therefore, as the current conduction increases, the stop position of the plunger 32 and the piston 35 shifts in the arrow direction, whereby an opening area of the slit 34 formed in the cylinder 33 increases.

Figure 4:
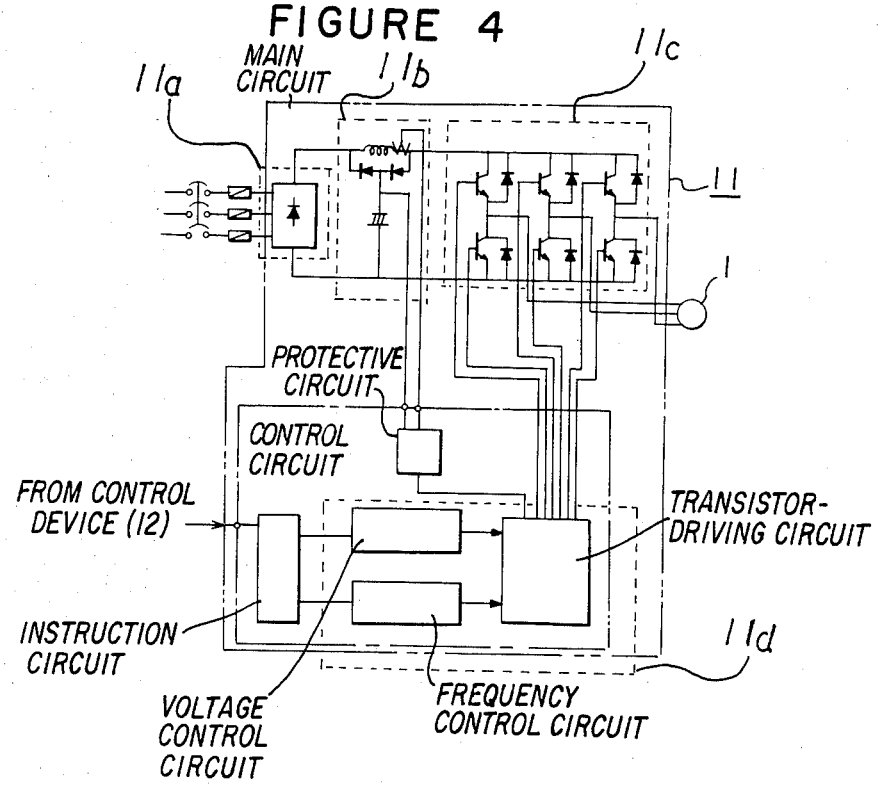
FIG. 4 is an electrical circuit diagram showing one embodiment of an inverter according to the present invention.

Since the electrically operated expansion valve 5 is of such a construction as described in the foregoing, it operates in exactly the same manner as the expansion valve, even when the flowing direction of the cooling medium becomes reversed. Also, the inverter 11 is constructed as shown in FIG. 4 and operates as follows.

The inverter 11 is of a type generally referred to as a frequency converter which is used to obtain a power source having a frequency ranging from several hertz to over a hundred hertz from a commercial power source (50 Hz or 60 Hz). The inverter generally comprises a converter 11a for converting an alternating current to a direct current through a bridge connection of diodes, a filter circuit 11b for smoothing current, consisting of a coil and a capacitor, an inverter 11c for reform the direct current into an alternating current through high power, high-speed switching transistors and a controller 11d for controlling and driving the transistors. In the inverter thus constructed, a single phase or three phase alternating current is subjected to full-wave rectification by the converter 11a consisting of four or six diodes having a bridge connection to be a direct current inclusive of pulsation. The resulted direct current is fed to the filter circuit 11b to remove the pulsation component and is supplied to each end of three sets of transistor groups, each consisting of serial connection of two transistors, three lead wires of a three phase motor 1 to be driven being respectively connected to each of the connecting portions of the transistors serially connected. The controller 11d oscillates three pulse waves each having 120° C. phase difference to successively apply them to the bases of the power transistors.

In the following, explanations will be made as to the operations of the capacity control type refrigeration cycle control device, according to the present invention, of the construction as mentioned in the foregoing. At the time of defrosting, the four-way valve 2 is in a connection as shown in FIG. 2, wherein the control device 12 issues an instruction of the maximum frequency to the inverter 11 of the capacity control type compressor 1, and further emits a signal to open the electromagnetic valve 10 for the by-pass 9, whereby the discharge gas flowrate of the compressor 1 increases.

Further, there is inflow of a high temperature, high pressure cooling medium which by-passes into the accumulator 7 through the by-pass 9, whereby the low pressure gaseous cooling medium, which has flown into the accumulator 7 through the four-way valve 2 from the heat-exchanger 6 at the refrigerating chamber interior, increases its pressure. As the consequence of this, there is produced a state of a smaller specific volume and a large circulating flowrate, whereby frost which has adhered onto the heat-exchanger 3 outside the refrigerating chamber can be defrosted in a short period of time.

On the other hand, when the evaporating temperature Te becomes able to be measured by the temperature sensor 14 and this evaporating temperature Te becomes lower than a set temperature $T_1$, there occurs apprehension such that frost would be adhered onto the heat-exchanger. In order to prevent the frosting phenomenon from taking place, a signal is again sent into both electromagnetic valve 10 and inverter 11 from the control device 12, whereby the electromagnetic valve 10 becomes open, the by-pass 9 is opened, and a portion of the discharge gas from the compressor 1 is mixed into the accumulator 7 through the by-pass, and whereby the warming capacity at the low temperature situation can be increased.

Figure 6:
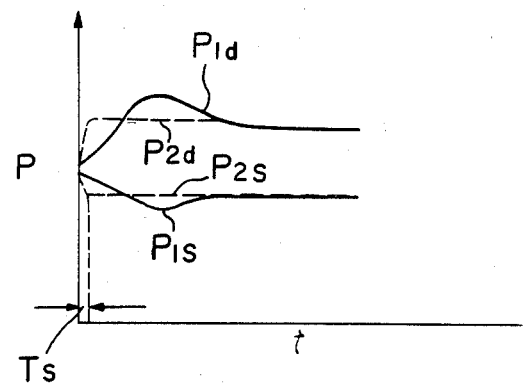
FIG. 6 is a characteristic diagram showing a relationship between time and pressure in a temperature controlled type expansion valve in the conventional capacity control type refrigeration cycle control device, and a relationship between time and pressure in the capacity control type refrigeration cycle control device according to the present invention.

Further, at the time of actuation of the compressor, the electrically operated expansion valve 5 is in a closed state, which is open with a delay of a certain definite time Ts second, whereby the rising characteristic of the refrigeration cycle improves as shown in FIG. 6. The abscissa t in FIG. 6 denotes a time, and the ordinate P represents a pressure. Also, the pressure characteristic $P_{1d}$ indicates variations with lapse of time in a discharge pressure by the conventional temperature operated type expansion valve, while $P_{1s}$ denotes a characteristic with lapse of time in the inlet pressure by the conventional temperature operated type expansion valve.

On the other hand, $P_{2d}$ denotes a characteristic, with lapse of time, of a discharge pressure, when the electrically operated expansion valve 5 is kept closed for a certain time period Ts sec. by the control device 12 according to the present invention, and then is opened at a time instant which is later than the actuation of the compressor, and $P_{2s}$ is the characteristic, with lapse of time, of the inlet pressure.

Figure 7:
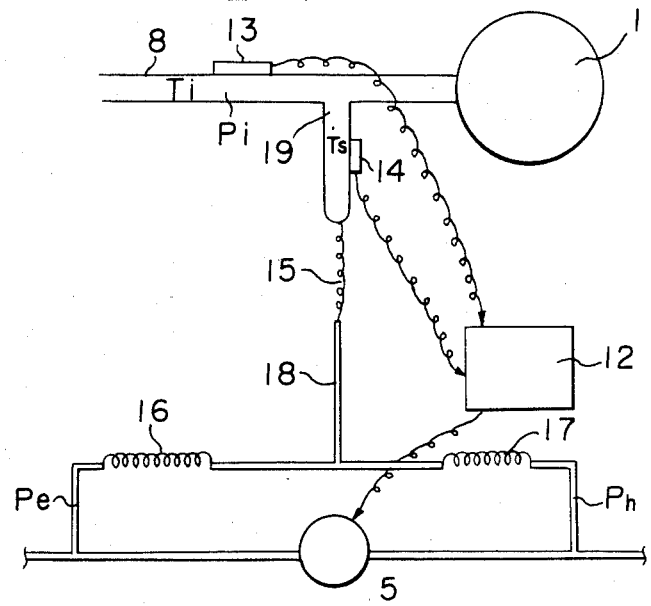
FIG. 7 is an enlarged view in the neighborhood of a by-pass in the capacity control type refrigeration cycle control device shown in FIG. 2.

Incidentally, with the conventional temperature operated type automatic expansion valve, it is not possible to take out an electrical signal of a value of the superheat for the inlet gas cooling medium into the compressor, which becomes possible with the temperature sensors 13 and 14 according to the present invention. FIG. 7 shows a detailed construction of a portion in the neighborhood of the by-pass 18.

In FIG. 7, a reference letter Ph denotes a pressure of the high pressure liquid cooling medium, and Pe a pressure of the low pressure liquid cooling medium. The high pressure cooling medium passes through the capillary tubes 17 and 15, and lowers its pressure in the chamber 19 to an inlet pressure Pi, whereby the cooling medium in the chamber 19 must have indicated a saturation temperature Ts with respect to the inlet pressure Pi. By detection of this temperature by the temperature sensor 14 and the temperature of the inlet cooling medium by the temperature sensor 13 provided in the intake tube 8, the super-heat quantity SH becomes able to be calculated by the control device 12 in accordance with the equation: $SH=Ti-Ts$. In this manner, the accurate super-heat quantity can always be detected even if the compressor changes its number of revolution, whereby protection of the compressor from unexpected disorder as well as high efficiency operation thereof can be made possible.

Next, explanations will be made in reference to the flow chart in FIG. 8 as to one embodiment of the operational and discriminatory functions within the control device 12. In this figure of drawing, Ti denotes a temperature of the inlet gaseous cooling medium into the compressor 1, Ts a saturation temperature, SH a super-heat quantity, SH1 and SH2 established values of the super-heat quantity, E a degree of opening of the electrically operated expansion valve at the time of the detecting operation, E* a degree of opening of the electrically operated expansion valve at the time of the subsequent instruction, $\Delta E$ a breadth of opening of the valve, and K a constant.

Figure 8:
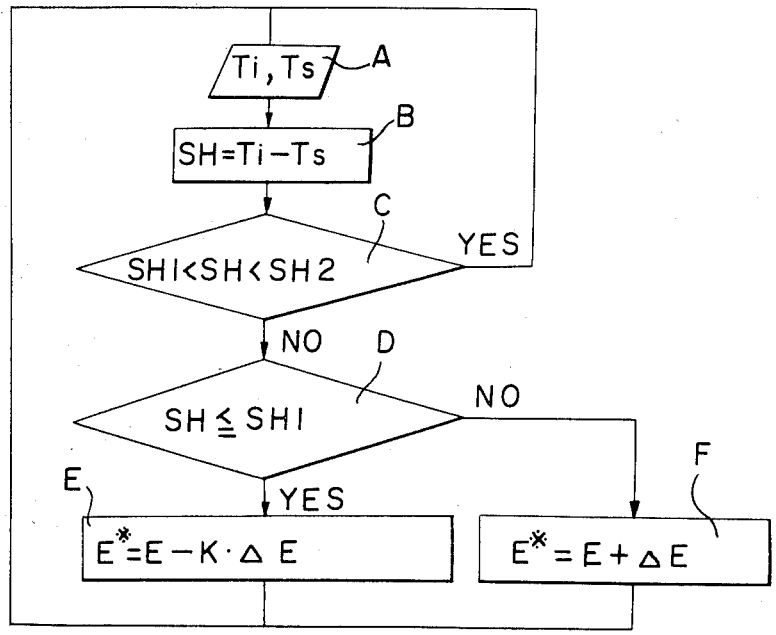
FIG. 8 is a flow chart for outlining the operations and determination functions of the control device for controlling the electrically operated expansion valve in the refrigeration cycle.

In FIG. 8, the saturation temperature Ts sensed by the temperature sensor 14 and the temperature Ti of the inlet cooling medium sensed by the temperature sensor 13, shown in FIG. 2, are read-in at every definite time $\Delta t$, which corresponds to Step A.

Subsequently, in Step B, a difference between the above-mentioned temperature Ti of the inlet cooling medium and the saturation temperature Ts is calculated as the super-heat quantity SH.

Therefore, in the subsequent Step C, if the super-heat quantity SH as calculated is larger than the established value SH1, but smaller than the established value SH2, the control operation returns from Step C to Step A, and the degree of opening of the electrically operated expansion valve 5 is measured again after the time $\Delta t$ with the degree of opening E* of the valve remaining as it is.

Also, in Step C, if the super-heat quantity is greater than the established value SH2, the control operation shifts from Step C to Step F, whereby the degree of opening E* of the electrically operated expansion valve 5 emits the signal $\Delta E$ to open the valve. Conversely, when the super-heat quantity SH as calculated is smaller than the established value SH1 (Step D), the degree of opening E* of the electrically operated expansion valve 5 emits a signal $-K\cdot\Delta E$ in the direction of its closure.

The characteristic here is that, in contrast to the signal for the breadth of opening of the electrically operated expansion valve 5 being $\Delta E$, the signal for the breadth of closing of the valve 5 is $-K\cdot\Delta E(K>1)$, which signifies that the closing breadth is greater than the opening breadth. This is for avoiding compression of the liquid cooling medium as much as possible from the standpoint of protecting the compressor 1, for which purpose the closing speed or closing quantity of the valve has been made greater than the opening speed or opening quantity thereof.

Next, explanations will be given in reference to the flow chart in FIG. 9 as to the condition for controlling the super-heat quantity in the electrically operated expansion valve 5 with the signals from the two temperature sensors 13 and 14, according to another embodiment of the present invention.

In the drawing, Ti refers to an inlet temperature, and Ts denotes a saturation temperature, both of which are the signals to be detected at every certain definite time and sent into the control device 12. When these two signals are sent into the control device 12 at Step A, the super-heat quantity SH can be calculated in this control device 12 at Step B in accordance with the equation $SH=Ti-Ts$.

Subsequently, at Step C, when the saturation temperature Ts is below a certain established value $T_0$, it corresponds to a low temperature in the external atmosphere, and the warming capability must have fallen short of. In this case, with a view to executing the warming capability-preference operation even at the sacrifice of EER, the super-heat quantity SH should preferably be brought to a value between a certain established value $T_3$ and $T_4$ (vide: Step D). On the other hand, when the saturation temperature Ts is greater than the certain established value $T_0$, it is desirable to perform the EER-preferance operations rather than the operations preferential to the warming capability.

Particularly important in the above-mentioned point is that, as is understandable from a relationship, as shown in FIG. 10, among the super-heat quantity SH, the warming capability Q, and the external temperature ($T_{01}>T_{02}$), the control device having a larger super-heat quantity SH increases its capability when the external temperature is as low as $T_{02}$, in contrast to a case when the external temperature is as high as $T_{01}$. From this, it will be seen that the set temperature in the flow chart of FIG. 9 is to satisfy the relationship of $T_1<T_2<T_3<T_4$ as in Steps G, H, and I.

Further, when the super-heat quantity SH is below the established range, the degree of opening E* of the electrically operated expansion valve 5 emits a signal to open the valve wider than the current degree of opening E in the direction of $+\Delta E$, and, when the super-heat quantity SH is above the established range, the degree of opening E* of the electrically operated expansion valve 5 emits a signal to close the valve narrower than the current degree of opening E at Step F in the direction of $-K\cdot\Delta E$.

An embodiment of the operational and discriminatory functions within the control device 12 as well as the control of the electrically operated expansion valve 5 was explained with reference to the flow chart of FIG. 8. Now, an embodiment of controlling the inverter-by-pass electromagnetic valve 10 within the control device 12 will be explained with reference to the flow chart of FIG. 11 wherein the flow chart represents a warming operation.

A defrosting operation starts after the compressor has been actuated and when the operating time tc of the compressor lapses sixty minutes or more and the evaporating temperature Te detected by the temperature sensor 14 is less than $-5°$ C. Then, the control device 12 generates a signal of the maximum frequency to the compressor 1 and a signal to open the by-pass electromagnetic valve 10. When the evaporating temperature Te becomes 8.0° C. or more, or the defrosting time lapses fifteen minutes, the defrosting operation ceases and the control device 12 generates a signal to close the by-pass electromagnetic valve 10. On the other hand, when the evaporating temperature Te detected by the temperature sensor 14 becomes less than $-5.0°$ C., there may occur a frosting phenomenon. In order to prevent it, the control device 12 generates a signal of the maximum frequency to the compressor 1 and a signal to open the by-pass electromagnetic valve 10 so that the operation is again started. When the evaporating temperature Te becomes 1.0° C. or more which is a temperature causing no defrosting phenomenon, a signal is again generated to close the by-pass electromagnetic valve 10. Furthermore, the operational frequency for the compressor is determined by the temperature $T_R$ detected by the temperature sensor 40 for detecting a room temperature and an output Ts from the variable resistor 41 giving a set temperature for a room, as shown in FIG. 5. A signal is generated in such a manner that when the room temperature is in a range of $Ts - 0.5°$ C. $\leq T_R < Ts$ for several minutes, the frequency is increased to a predetermined value, whereas when the room temperature $T_R$ is in a range of $Ts < T_R < Ts + 0.5°$ C. for several minutes, the frequency is decreased to a predetermined value so that the room temperature comes close to the set temperature Ts. In FIG. 11, a symbol represents time and $\Delta t$ represents an interval of sampling time for inputting the signal from each of the sensors.

As stated in the foregoing, the super-heat detection system for the refrigeration cycle according to the present invention is so constructed that the by-pass is provided between the connecting portion of the electrically operated expansion valve and the heat-exchanger at the chamber interior and the inlet side of the compressor, through which by-pass direction is effected on a temperature corresponding to an inlet pressure of the coolant gas at the open end in this by-pass and a temperature of the coolant gas to be taken into the compressor, which is introduced into the accumulator from the heat-exchanger at the chamber interior followed by its intake into the compressor, and then the super-heat quantity of the coolant gas taken into the compressor is calculated by a control device on the basis of a difference between the two temperature to thereby control the electrically operated expansion valve. With such construction of the super-heat detection system, therefore, the absolute value of the super-heat quantity can be detected, which makes it possible to carry out accurate control of the electrically operated expansion valve, even when a pressure loss takes place in the section between the inlet and the outlet of the heat-exchanger at the chamber interior (i.e., evaporator), whereby protection and performance control of the compressor can be improved, and the energy-saving operation thereof can be practiced in a precise manner.

Also, the super-heat detection system of the present invention is so constructed that the degree of opening of the electrically operated reversible expansion valve is controlled by the super-heat quantity, and the high temperature, high pressure coolant gas, which has been compressed by the compressor, is introduced at the time of the warming operation into the heat-exchanger at the chamber interior to liquefy the same into a low temperature, high pressure coolant liquid and to introduce the same into the electrically operated reversible expansion valve from the reverse direction so as to be expanded into a two-phase coolant of high temperature and low pressure, hence the performance control of the control device can be improved in its energy-saving operation and other operations, taking into consideration the comfortableness of the conditioned air.

Further, since the super-heat detection system according to the present invention is so constructed that the degree of opening of the electrically operated expansion valve is controlled on the basis of the super-heat quantity, and it be made greater when any of the external temperature, the pressure at the low pressure side, and the temperature at the low pressure side is below its predetermined value, there can be performed control of the opening degree of the expansion valve in the EER-preferance fashion under the standard temperature condition, while the warming capability-preferential opening degree of the valve can be effected when the warming capability falls short of a low temperature situation, whereby precise control can be accomplished for the operation of the control device in consideration of the comfortableness of the conditioned air and energy-saving aspect of the device operation.

Furthermore, since the super-heat detection system according to the present invention is so constructed that external operation and determination are performed by the control device in such a manner that the absolute value of the super-heat quantity may reach a predetermined one by its detection, and that the electrically operated expansion valve may be driven and controlled by this control device, it possesses such advantage that the compressor can be well protected, while maintaining the super-heat quantity, and that reliability and performance of operations for the refrigeration cycle can be improved.

Moreover, the super-heat detection system according to the present invention is so constructed that, at the time of defrosting, the low temperature, low pressure coolant gas discharged from the heat-exchanger at the side of the chamber interior and the high temperature, high pressure coolant gas discharged from the compressor are introduced into the accumulator through the by-pass to be mixed therein, after which the mixed gas may be returned to the compressor, the specific volume of the gaseous cooling medium taken into the compressor becomes small, and the circulation flow rate of the coolant gas remain abundant even after deduction of its by-pass flow rate, whereby the frosted heat-exchanger outside the chamber can be defrosted in the quickest possible manner, which is different from the conventional reverse cycle defrosting system. Thus, the control device according to the present invention possesses such remarkable advantages that it quickly finishes the defrosting operation from an aspect of comfortableness in the chamber interior at the time of the warming operation, and thereafter resumes the cooling operation.

Briefly, in accordance with the control device for refrigeration cycle of the present invention, super-heat can be controlled as desired by external signals; the saturation temperature corresponding to a saturation pressure can be detected regardless of pressure loss of a cooling medium in an evaporator and a pipe; manufacturing cost is inexpensive because of use of temperature sensors; and the construction of the device is simple because the inlet and outlet of a linear expansion valve are reversible.

Although, in the foregoing, the present invention has been described with particular reference to preferred embodiments thereof, it should be understood that any changes and modifications may be made to it by those skilled persons in the art within the ambit of the present invention as set forth in the appended claims.

We claim:
1. A control device for a refrigeration cycle constructed with a compressor, a four-way valve for change-over of a cooling medium, a condenser, an elec- trically operated expansion valve, an evaporator and an accumulator, all being serially connected, said control device further comprising a by-pass extending at least one terminal of said expansion valve to an inlet of said compressor through a capillary tube; a first temperature sensor to detect temperature of the cooling medium at an open end to the inlet side of said compressor in said by-pass; a second temperature sensor to detect temperature of the cooling medium within an intake tubing, through which the cooling medium is taken into said compressor through the inlet thereof; and a control device which calculates a super-heat quantity of the cooling medium taken into said compressor on the basis of a difference between detected outputs of said first and second temperature sensors, and performs control of a degree of opening of said electrically operated expansion valve, wherein a separate by-pass from the compressor outlet to the accumulator having an electromagnetic valve controlled by said control device which causes a high temperature and high pressure cooling medium from the discharge side of said compressor to be by-passed into the accumulator at the time of defrosting operation by said air conditioning device utilizing refrigeration cycle for increasing the pressure of the low pressure cooling medium from said evaporator.

2. The control device for refrigeration cycle according to claim 1, characterized in that, at the time of defrosting operation, said electromagnetic valve is opened to operate said compressor at its maximum performance to thereby control the reverse cycle defrosting.

3. The control device for refrigeration cycle according to claim 1, characterized in that, at the time of low temperature warming operation, said electromagnetic valve is opened to operate said compressor at its maximum performance.

4. The control device for refrigeration cycle according to claim 1, characterized in that, at the time of actuating said compressor, said electrically operated expansion valve is kept closed, and, after delay of a certain definite time period, said electrically operated expansion valve is opened.

5. A refrigerating system, comprising:
a compressor having an input and an output;
a four-way valve having a first and second input and a first and second output, the output of said compressor being connected to said first input;
a condenser having an input connected to the first output of said four-way valve and an output;
an electrically operated expansion valve having an input connected to the output of said condenser and an output;
an evaporator having an input connected to the output of said expansion valve and an output connected to the second input of said four-way valve;
an accumulator having an input connected to the second output of said four-way valve and an output connected to the input of said compressor;
a first capillary tube connected to the input of said expansion valve;
a second capillary tube connected to the output of said expansion valve and to said first capillary tube;
a first by-pass having a first end connected to the junction of said first and second capillary tubes and a second end connected to the input of said compressor;
a second by-pass having a first end connected to the output of said compressor and a second end connected to said accumulator;
an electromagnetic valve controlling the flow in said second by-pass;
a first temperature sensor provided at the input to said compressor;
a second temperature sensor provided near said second end of said first by-pass;
an inverter for providing power to said compressor;
a control device for receiving inputs from said first and second temperature sensors and providing outputs to control said expansion valve, said electromagnetic valve and said inverter;
wherein said control device calculates the superheat from said inputs from said first and second temperature sensors.

* * * * *